(No Model.)
C. R. GOSTLING.
PROCESS OF MANUFACTURING HYDRAULIC CEMENT.
No. 387,588. Patented Aug. 7, 1888.
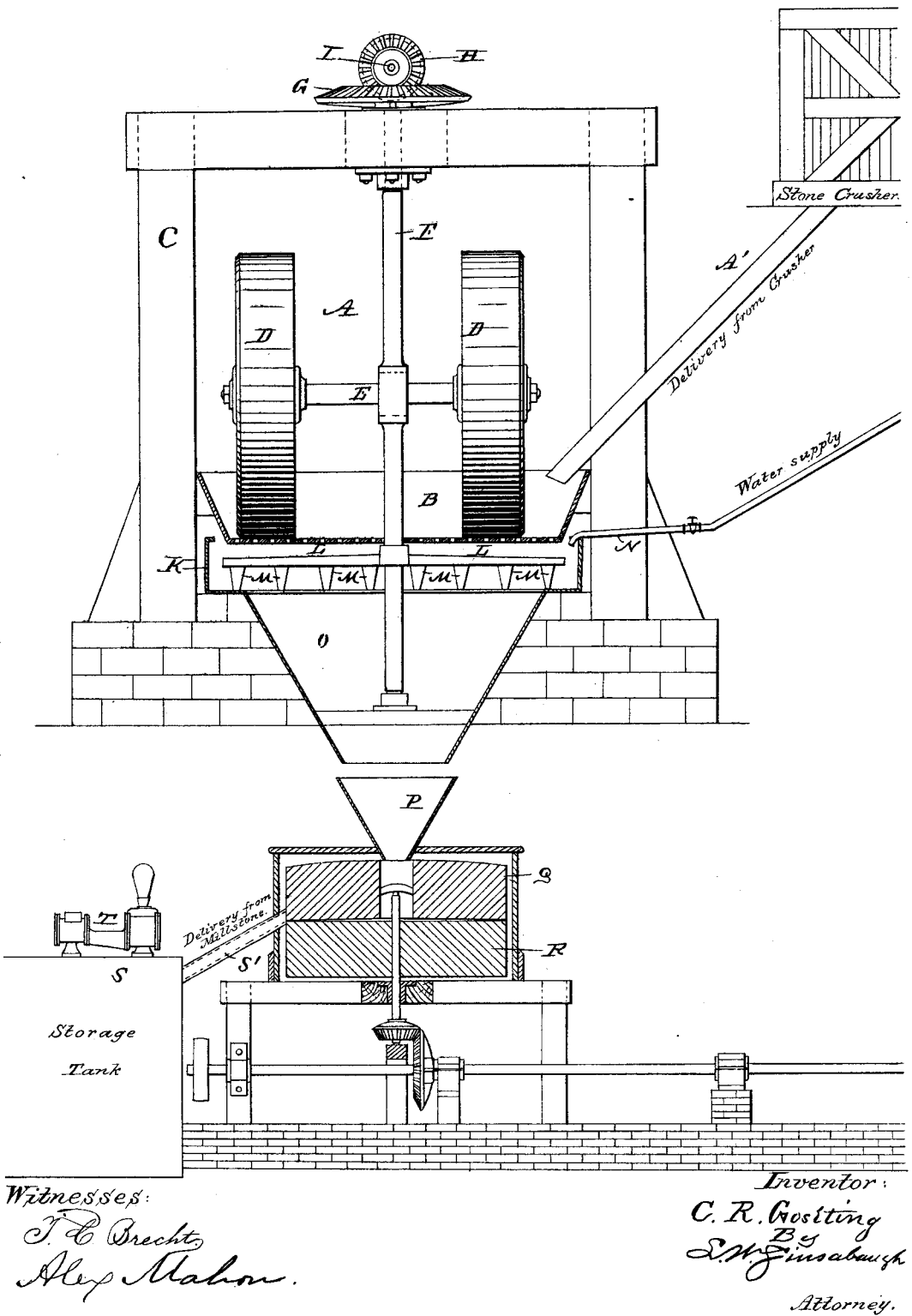

UNITED STATES PATENT OFFICE.

CHARLES R. GOSTLING, OF WHITEHALL, PENNSYLVANIA.

PROCESS OF MANUFACTURING HYDRAULIC CEMENT.

SPECIFICATION forming part of Letters Patent No. 387,588, dated August 7, 1888.

Application filed November 2, 1887. Serial No. 254,062. (No model.)

*To all whom it may concern:*

Be it known that I, CHARLES R. GOSTLING, a citizen of the United States of America, residing at Whitehall, in the county of Lehigh and State of Pennsylvania, have invented certain new and useful Improvements in the Method of Manufacturing Hydraulic Cement, of which the following is a specification, reference being had therein to the accompanying drawing.

My invention relates to improvements in the method of manufacturing Portland and other hydraulic cements.

The object of my invention is to produce a stronger and better cement than has been heretofore produced by the ordinary methods of making cements.

My invention consists in subjecting the limestone, shale, clay, or other material used in making the cement to a grinding action to reduce it to a certain degree of fineness, then subjecting such ground material to a mixing action in the presence of water, then still further reducing the material while in a plastic condition by subjecting it to the action of burr-stones, pumping this plastic mass into a suitable kiln and drying the same, burning the mass, and finally reducing it to an impalpable powder. I accomplish these ends by means of the devices shown in the accompanying drawing, which represents an elevation of the entire plant partly in section, except the kiln for drying the plastic mass, this feature being shown, described, and claimed in a separate application filed of even date herewith, Serial No. 254,063.

The limestone, clay, shale, or other material of which the cement is composed is first subjected to the action of a suitable crusher to reduce the material to a uniform size, after which it is passed to the reducing-mill A through the spout A'. The reducing-mill A is, by preference, of that type known as "chasing-mills," which consists of the pan or receptacle having a perforated bottom in which the chasing rolls or wheels D are caused to travel, said rolls being mounted on the horizontal shaft E. The horizontal shaft E is connected to the vertical shaft F, and the lower end of the shaft F rests in a suitable step, while the upper end is supported in the frame C and is provided with a bevel gear-wheel, G, which meshes with the bevel gear-wheel H, mounted on the shaft I and driven from any suitable source of power.

K is a mixing-pan mounted in suitable supports below the grinding-pan B and into which the ground material falls from the said grinding-pan, the bottom of the said mixing-pan being provided with suitable apertures or doors to allow the plastic mass to fall through into the hopper P.

L represents arms secured to the shaft F, and are provided with blades or teeth M, which stir or mix the ground material with water, which is admitted to the mixing-pan K through the pipe N. The sheet metal or other casing O below the mixing-pan K is contracted at its lower end, so as to direct the plastic material from the mixing-pan to the hopper P, from which it gravitates to the burr-stones Q R, said burr-stones being of the usual or well-known construction and driven in any suitable manner.

The material after being finely ground in the wet or plastic condition gravitates through the spout S' from the burr-stones to the storage-tank S, from whence it is transferred to a drying-chamber by means of a suitable pump, T, where it is dried and afterward burned and reduced to a powdered condition. The drying-chamber is not shown in this connection but forms the subject-matter of a separate application, as already indicated.

I am aware that it is not new to mix up the different elements composing the cements in the proper proportions into a wet and pasty state under vertical mullers, then pressing this mass into bricks, which are burned and afterward reduced to a powder, and such I do not claim.

What I claim is—

An improvement in the art of manufacturing hydraulic cement, which consists in crushing and grinding the material of which the cement is composed, mixing the ground mass with water to reduce it to a plastic or semi-plastic condition, regrinding the plastic or semi-plastic mass to still further reduce it, and transferring this plastic body in mass into a suitable chamber to dry the same, after which it is burned and reduced to an impalpable powder, as set forth.

In testimony whereof I affix my signature in presence of two witnesses.

CHARLES R. GOSTLING.

Witnesses:
GEORGE W. LERCH,
R. CLAY HAMERSLY.